G. A. SCHIPPER.
IRREVERSIBLE STEERING GEAR FOR FORD CARS.
APPLICATION FILED NOV. 3, 1921.
1,418,679.
Patented June 6, 1922.
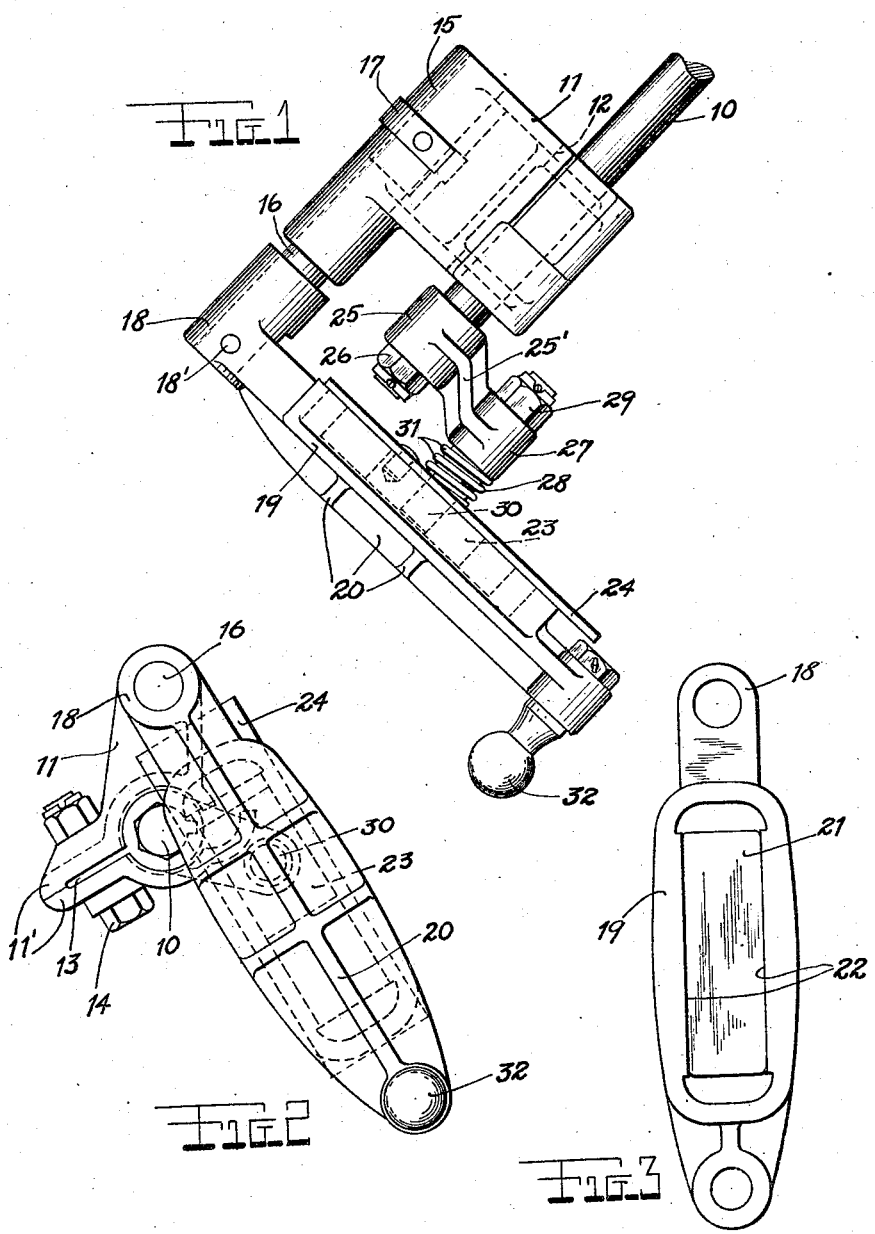
INVENTOR
G.A. Schipper
BY
ATTORNEY

UNITED STATES PATENT OFFICE.

GEORGE A. SCHIPPER, OF AURORA, INDIANA.

IRREVERSIBLE STEERING GEAR FOR FORD CARS.

1,418,679. Specification of Letters Patent. Patented June 6, 1922.

Application filed November 3, 1921. Serial No. 512,417.

*To all whom it may concern:*

Be it known that I, GEORGE A. SCHIPPER, a citizen of the United States, residing at Aurora, in the county of Dearborn and State of Indiana, have invented certain new and useful Improvements in Irreversible Steering Gears for Ford Cars, of which the following is a specification.

This invention relates to irreversible steering gears for motor vehicles, and has special reference to Ford, the main object being the provision of a device which can be readily attached to the steering mechanism without any change or alternation having to be made on the same.

Another object is to provide an attachment giving a double movement ratio thereby eliminating distortion of steering post, minimizing vibration, and easier manipulation of the steering wheel.

These and other objects will become apparent in the description below in which characters of reference will refer to the like-named parts in the drawing.

Referring briefly to the drawing, Figure 1 represents a side elevation of the device, and in which position it would be placed on a Ford motor car.

Figure 2 is a bottom plan view of the device and shows it in one of its extreme positions.

Figure 3 is a top plan view of the lever arm showing the slide block recess in detail.

Referring more in detail to the drawings the numeral 10 represents the steering post of a Ford car which is usually supported at its lower end by a sleeved bracket, the latter not shown on the drawing.

A main body is secured to the sleeve of aforesaid bracket by slipping hole 12 thereon and is securely fixed in position by the pair of bolts 14, engaging the slit extensions 11' of the main body 11. It is obvious that this means of securing will permit minute radial adjustment. Clearance 13 is provided between the extensions 11' to insure a secure gripping of the sleeved bracket.

A sleeve 15 having a shaft 16 revolubly mounted therein, is integrally formed to the main body 11.

A collar 17 is secured to the shaft 16 and is adapted to prevent longitudinal displacement of the same.

A bearing collar 18 forming part of the lever arm 19 is securely fixed to the lower end of the shaft 16 by a taper pin 18'. The lever arm is provided with webs on one surface 20 to give strength and rigidity thereto. The face side of the lever arm has a recess 21 formed therein in which a slide block 23 is adapted to slide laterally between the guide surfaces 22. A protective plate 24 sliding with block 23 is provided to keep the recess 21 free from dust and dirt.

The lower end of steering post 10 has secured thereto one end of a crank arm 25 by the nut 26. Webs 25' are provided against fracture by shock.

The opposite end of the crank arm 25 has a sleeve 27 integrally formed thereto, and in which a stud 28 is secured by the nut 29. Extension 30 of stud 28 engages the hole in block 23 and actuates the latter.

A tension spring 31' is retained on stud 28 and is provided to keep plate 24 in constant contact with the surface of arm 19.

It is obvious from the drawing that, when the device is mounted and operating, the knuckle 32, which is connected directly to the steering rod and secured to the lower end of lever arm 19, will move radially about the centre formed by shaft 16. As the steering post 10 actuates the crank 25 the lever arm 19 will be moved arcuately, and as the distance between the active centre of the said crank arm is one half of the distance between the lever arm centres, it readily becomes apparent that the latter will traverse only half the arcuate distance that the crank arm 25 does, thus giving a ratio of 2:1., thereby insuring easy manipulation of the steering wheel.

Owing to the double movement ratio, stabilization in steering the car is gained, as the levers are in a position offering the least resistance when the front wheels are pointed in a forward or straight-away direction. The advantage of this may be apparent by mentioning that, when the car is turning a corner in either direction and control of the steering wheel is released, the forward wheels will gradually and effectively straighten out into the straight-away direction.

I claim:

The combination with an automobile steering rod, of a main body bracket adapted to be secured to the steering rod bracket and having a sleeve extension, a shaft revolubly secured in said sleeve and having a lever arm secured thereto, the latter having a guide recess formed therein, a crank arm secured to the lower end of steering rod, a stud secured to one end of the crank arm, a slide block having a hole therein, slidably engaged in the recess of the lever arm and actuated by the crank arm stud, a plate secured to the slide block adapted to cover the lever arm surface, and a spring retained on the stud member, and adapted to keep the plate member in engagement with the lever arm surface.

In witness whereof I affix my signature.

GEORGE A. SCHIPPER.